United States Patent
Kondo

(10) Patent No.: US 11,509,150 B2
(45) Date of Patent: *Nov. 22, 2022

(54) METHODS AND APPARATUS FOR INHIBITING EXCESSIVE BATTERY DISCHARGE

(71) Applicant: SEMICONDUCTOR COMPONENTS INDUSTRIES, LLC, Phoenix, AZ (US)

(72) Inventor: Hideo Kondo, Oizumi-machi (JP)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 406 days.

This patent is subject to a terminal disclaimer.

(21) Appl. No.: 16/781,777

(22) Filed: Feb. 4, 2020

(65) Prior Publication Data

US 2020/0177002 A1 Jun. 4, 2020

Related U.S. Application Data

(63) Continuation of application No. 14/683,382, filed on Apr. 10, 2015, now Pat. No. 10,666,069.

(51) Int. Cl.
*H02J 7/00* (2006.01)

(52) U.S. Cl.
CPC ........ *H02J 7/00306* (2020.01); *H02J 7/0029* (2013.01); *H02J 7/0048* (2020.01); *H02J 7/0063* (2013.01); *H02J 7/00714* (2020.01); *H02J 7/0025* (2020.01)

(58) Field of Classification Search
CPC ...... H02J 7/0029; H02J 7/0047; H02J 7/0048; H02J 7/0063; H02J 7/00306; H02J 7/00714; H02J 7/0025; H02J 7/0078; H02J 2007/0067
USPC ................................ 320/114, 132, 134, 136
See application file for complete search history.

(56) References Cited

U.S. PATENT DOCUMENTS

| | | | |
|---|---|---|---|
| 6,586,911 B1* | 7/2003 | Smith | H01M 10/46 320/136 |
| 6,969,974 B1 | 11/2005 | Liu | |
| 10,666,069 B2* | 5/2020 | Kondo | H02J 7/0078 |
| 2004/0257042 A1 | 12/2004 | Liu et al. | |
| 2006/0187072 A1* | 8/2006 | Bruce | H01M 10/48 320/136 |
| 2007/0030244 A1* | 2/2007 | Ishii | G09G 3/344 345/107 |
| 2011/0215767 A1* | 9/2011 | Johnson | H02J 7/007 320/136 |
| 2011/0273804 A1 | 11/2011 | Ikeuchi et al. | |
| 2012/0181991 A1* | 7/2012 | Gofman | H02J 7/0078 320/150 |

* cited by examiner

*Primary Examiner* — Edward Tso
*Assistant Examiner* — Aaron Piggush
(74) *Attorney, Agent, or Firm* — Dickinson Wright PLLC

(57) ABSTRACT

A system for it inhibiting the excessive discharge of a battery in an electronic device, in some embodiments, comprises: a battery to supply power to the electronic device; and a fuel gauge coupled to the battery to monitor said power, wherein the fuel gauge enters a standby mode upon determining that a voltage supplied by the battery is at or below a voltage threshold and that a capacity of the battery is at or below a capacity threshold.

20 Claims, 3 Drawing Sheets

METHODS AND APPARATUS FOR INHIBITING EXCESSIVE BATTERY DISCHARGE

This application is a continuation of U.S. patent application Ser. No. 14/683,382, filed Apr. 10, 2015.

BACKGROUND

Lithium ion batteries are often used to power consumer electronics, such as smart phones, tablets, laptops, video cameras and handheld game consoles. Various operating conditions may result in an excessive discharge of the battery in such a device. For example, allowing the device to remain unused for extended periods of time may result in a progressive electrode breakdown. In some cases, such excessive battery discharge may result in potentially dangerous operating conditions.

SUMMARY

At least some of the embodiments disclosed herein are directed to a system for inhibiting the excessive discharge of a battery in an electronic device, comprising a fuel gauge coupled to the battery to monitor power supplied by the battery, wherein the fuel gauge enters a standby mode upon determining that a voltage supplied by the battery is at or below a voltage threshold and that a capacity of the battery is at or below a capacity threshold. At least some of these embodiments may be supplemented by one or more of the following concepts, in any order or in any combination: wherein the battery is a lithium ion battery; wherein the fuel gauge enters said standby mode if and only if the fuel gauge determines that the voltage supplied by the battery is at or below said voltage threshold and that said capacity of the battery is at or below the capacity threshold; wherein the system determines said capacity of the battery using a Coulomb counting technique; wherein said standby mode is the lowest power mode available on said fuel gauge; wherein, to enter the standby mode, the fuel gauge stops a clock associated with the fuel gauge; wherein, to enter the standby mode, the fuel gauge opens a port associated with the fuel gauge; wherein the voltage and capacity thresholds are programmable; wherein the fuel gauge autonomously makes said determinations and autonomously enters the standby mode; wherein, upon detecting that said voltage has risen above the voltage threshold or that said capacity has risen above the capacity threshold, the fuel gauge exits the standby mode; wherein, to exit the standby mode, the fuel gauge enters a power mode higher than the standby mode; wherein said voltage threshold is in the range of 2.0 Volts to 2.5 Volts, inclusive; wherein said capacity threshold is in the range of 0% to 5%, inclusive.

At least some embodiments are directed to an electronic device comprising a fuel gauge that enters a standby power mode upon detecting that a voltage supplied by a battery in said electronic device is at or below a voltage threshold and that a capacity of the battery is at or below a capacity threshold. At least some of these embodiments may be supplemented by one or more of the following concepts, in any order and in any combination: wherein said capacity threshold is between 0% and 1%, inclusive; wherein the electronic device is selected from the group consisting of: a smart phone, a tablet, a laptop, a video camera and a handheld game console; wherein said capacity is determined using a Coulomb counting technique.

At least some embodiments are directed to a method for inhibiting the excessive discharge of a battery in an electronic device, comprising: determining that a voltage supplied by said battery is at or below a voltage threshold and that a capacity of said battery is at or below a capacity threshold; and causing a fuel gauge in said electronic device to autonomously enter a standby power mode based on said determination. At least some of these embodiments may be supplemented by one or more of the following concepts, in any order and in any combination: wherein said capacity threshold is between 0% and 0.5%, inclusive; wherein said standby power mode is the lowest power mode available on said fuel gauge.

BRIEF DESCRIPTION OF THE DRAWINGS here are disclosed in the drawings and in the following description systems and methods for inhibiting excessive battery discharge using battery voltage and capacity measurements. In the drawings.

Figure 1:
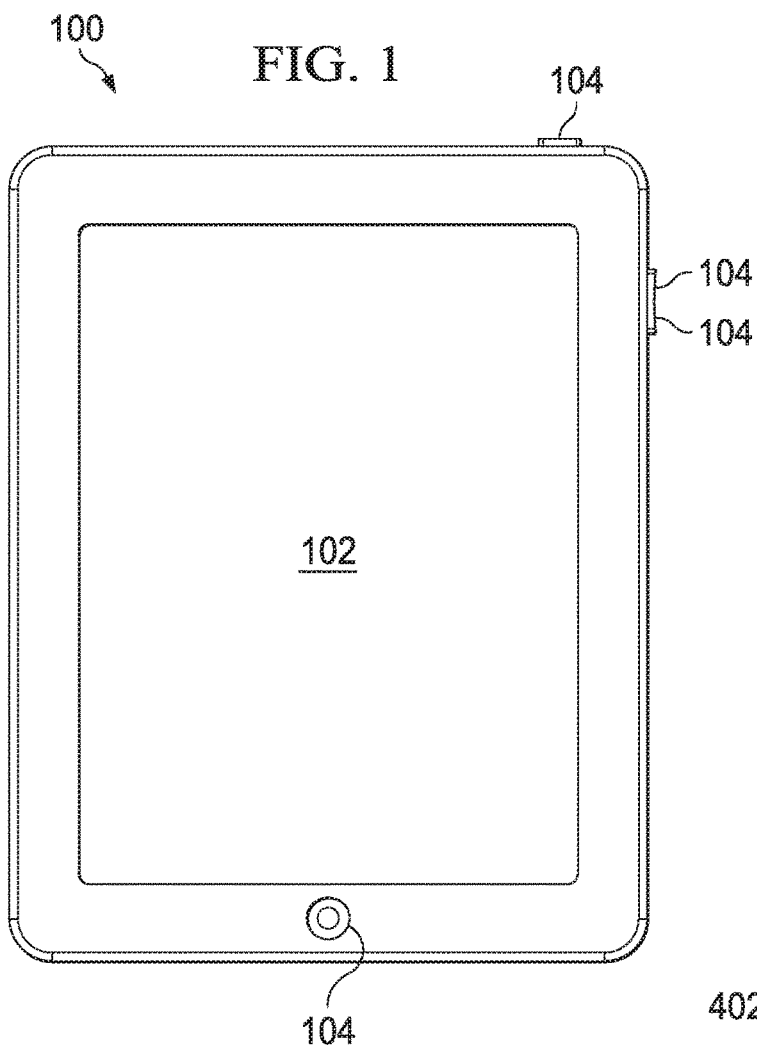
FIG. 1 is a front view of a consumer electronic device.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are methods and systems for inhibiting excessive battery discharge using battery voltage and capacity measurements, Generally, an electronic device implementing such techniques includes a battery that supplies power to the electronic device and a fuel gauge that monitors the battery. To prevent excessive battery discharge, the fuel gauge autonomously monitors multiple parameters associated with the battery—namely, a voltage provided by the battery and the remaining capacity of the battery—to determine whether to switch itself into a lower power mode, such as a standby mode. Typically, the fuel gauge switches to a lower power mode if it determines that the voltage provided by the battery has met or fallen below a specified voltage threshold and that a capacity of the battery has met or fallen below a specified capacity threshold. In preferred embodiments, both of these conditions must be met before the fuel gauge switches to a lower power mode.

FIG. 1 is a front view of an illustrative consumer electronic device 100 that implements the systems and methods described herein. The electronic device 100 may be any suitable device that uses a lithium ion battery. Non-limiting examples of such electronic devices include smart phones (e.g., APPLE iPHONE®, SAMSUNG GALAXY NOTE®), tablets (e.g., APPLE iPAD®, AMAZON KINDLE®), laptops, video cameras (including camcorders), and handheld game consoles (e.g., SONY PLAYSTATION VITA®), Other such devices are contemplated and included within the scope of this disclosure. The illustrative consumer electronic device 100 includes a display screen 102 that is preferably a touch screen. It further includes various tactile input devices 104, such as buttons arranged in various locations around the exterior of the electronic device 100. Additional input and output devices, such as microphones and speakers, also may be incorporated within such a device.

Figure 2:
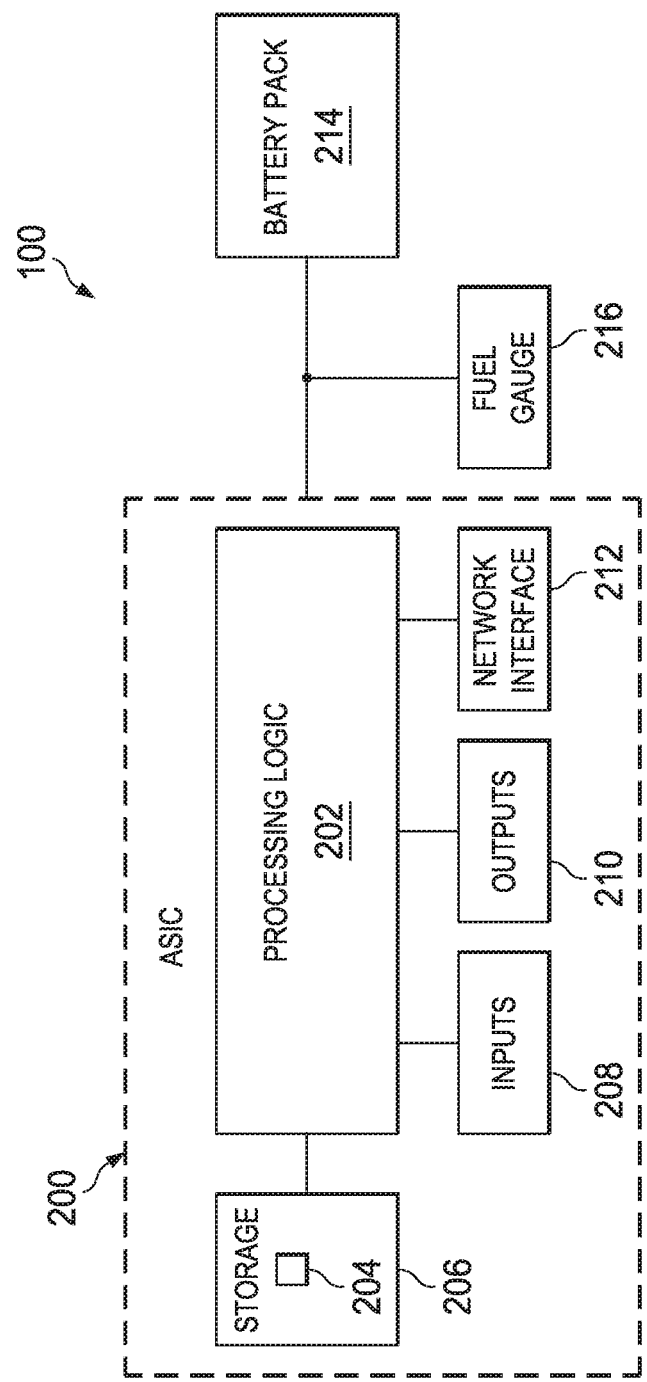
FIG. 2 is a block diagram of components within a consumer electronic device.

FIG. 2 is a block diagram of components within the illustrative consumer electronic device 100. The electronic device 100 includes an application-specific integrated circuit (ASIC) 200 comprising processing logic 202 (e.g., a microprocessor), storage 206 coupled to the processing logic 202 and comprising software code 204 (e.g., an operating system or applications), input features 208 (e.g., buttons, touch screen, microphone), output features 210 (e.g., display screen that may be the same as the touch screen, speaker, haptic feedback motor), and a network interface 212 for communicating with other devices (e.g., via the Internet), Other components may be included on the ASIC 200. The AMC 200 is powered by a battery pack ("battery") 214. A fuel gauge 216 couples to the battery 214. In at least some embodiments, the ASIC 200, the fuel gauge 216 and the battery 214 couple to each other in a parallel configuration, so that the ASIC 200 may receive power from the battery 214 while the fuel gauge 216 monitors the output of the battery 214. Further, in some embodiments the ASIC 200 may be replaced by a plurality of ASICs or other circuitry. The techniques disclosed herein may be implemented in any electronic device in which any suitable type of load (here, the ASIC 200) is powered by the battery 214. In operation, and as described in greater detail with respect to FIG. 3, the fuel gauge 216 monitors the voltage output by the battery 214, and the fuel gauge 216 also monitors a capacity of the battery 214. If both the voltage and the capacity meet or drop below respective voltage and capacity thresholds, the fuel gauge 216 autonomously switches itself into a lower power consumption mode than its current power mode—for example, a sleep mode (also known as a standby mode).

Figure 3:
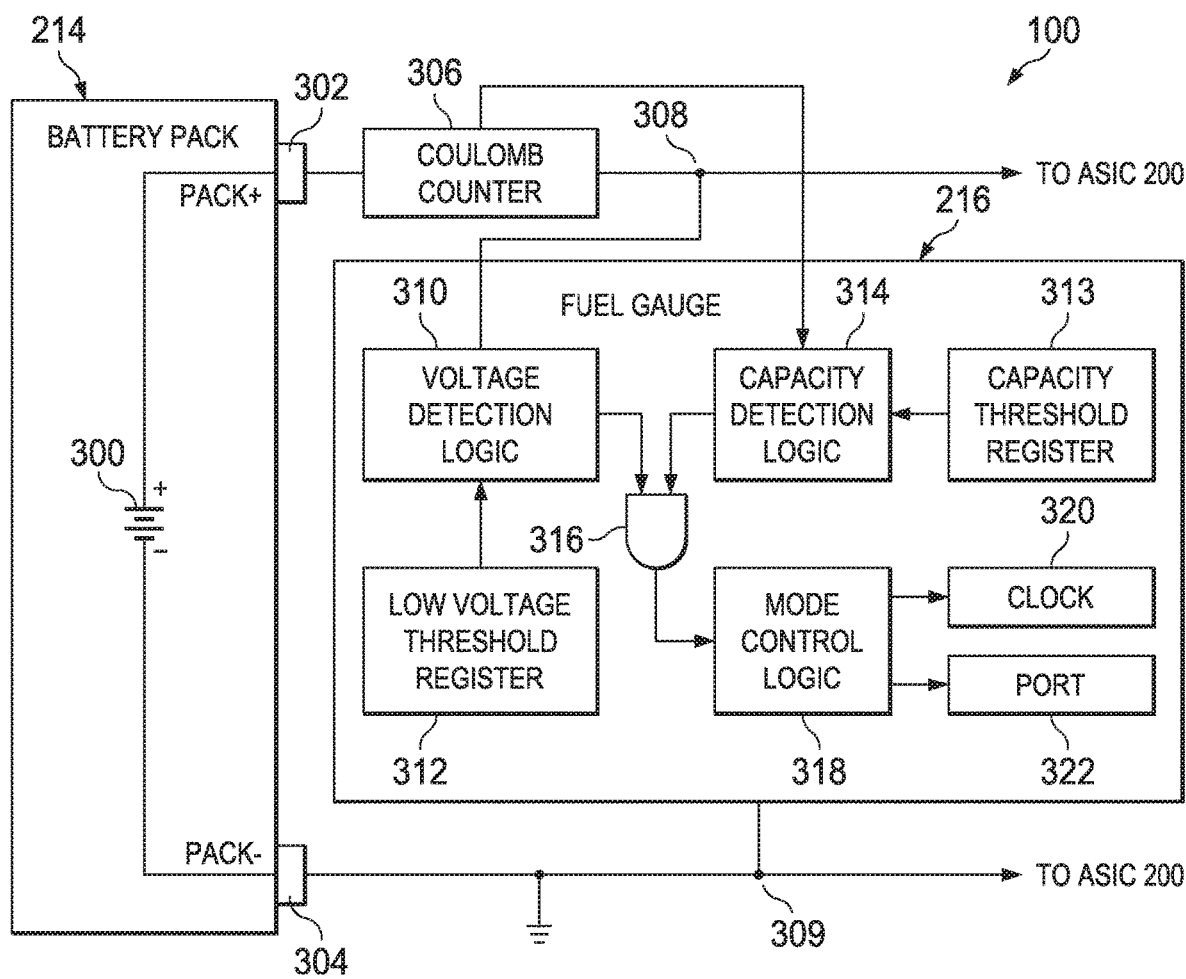
FIG. 3 is a block diagram of components within a consumer electronic device and, more particularly, within a fuel gauge in the consumer electronic device.

FIG. 3 is a block diagram of components within the consumer electronic device 100 and, more particularly, within the fuel gauge 216. The block diagram of FIG. 3 is conceptual in nature, meaning that at least some of the blocks represent functions performed by the various parts of the electronic device 100. The actual circuit logic used to implement the functions represented by the blocks may vary depending on design considerations and preferences and will be readily known to or determined by one of ordinary skill in the art.

Referring to FIG. 3, the electronic device 100 includes the battery 214 and the fuel gauge 216, which couples in parallel to the battery 214. The battery 214 includes a voltage source 300, which couples to positive and negative terminals 302 and 304. The negative terminal 304 couples to the fuel gauge 216 via a node 309, which, in turn, couples to ground. Node 309 also is provided to the ASIC 200 or other suitable circuit logic being powered by the battery 214. The positive terminal 302 couples to a Coulomb counter 306, the output of which couples to a node 308. Any suitable Coulomb counting device may be used. The node 308 couples to the fuel gauge 216 and is also provided to power the ASIC 200.

The fuel gauge 216 includes a voltage detection logic 310 that couples to node 308; a low voltage threshold register 312; a capacity detection logic 314 that receives an output of the Coulomb counter 306; a capacity threshold register 313 that couples to the capacity detection logic 314; and an ANT) gate 316 or similar logic that couples to the outputs of the voltage detection logic 310 and the capacity detection logic 314. The output of the AND gate 316 (or comparable logic) is provided to a mode control logic 318. The mode control logic 318 controls a clock 320 of the fuel gauge 216 and a port 322 through which the fuel gauge 216 couples to other devices in the electronic device 100 (e.g., the ASIC 200).

In operation, the voltage source 300 delivers a potential across the terminals 302, 304. The Coulomb counter 306 receives current via the terminal 302 and uses an internal resistance, in tandem with an internal tinier, to determine a Coulomb count (i.e., current that accumulates over time). This Coulomb count reflects the total current discharge of the battery 214. The capacity detection logic 314 compares the Coulomb count to an original capacity of the battery 214 to determine the present capacity of the battery 214 (also known as the remaining capacity of the battery 214). The scope of this disclosure is not limited to using a Coulomb counter as shown in FIG. 3. Other configurations are contemplated. For example, the resistor used to sense the current and the timer and processing logic used to count the accumulated current may be distributed in different parts of the electronic device 100.

The capacity detection logic 314 autonomously monitors the present capacity of the battery 214 and compares the capacity against a capacity threshold value that is provided by the programmable capacity threshold register 313 (e.g., using a comparator). The capacity threshold value may be set to any suitable value, and in at least some embodiments, this value is in the range of 0% to 5%, inclusive. In some embodiments, the value is in the range of 0% to 1%, inclusive. In some embodiments, the value is in the range of 0% to 0.5%, inclusive. If the capacity detection logic 314 determines that the capacity of the battery 214 meets or drops below the capacity threshold value, it generates a flag signal (e.g., a HIGH value on its output). This flag signal, which is otherwise LOW, is provided to the AND gate 316.

The voltage detection logic 310 autonomously monitors the output voltage of the battery 214, in cases where a voltage drop is introduced into the connection between the voltage detection logic 310 and the battery 214 (e.g., by a Coulomb counter or other logic), the voltage detection logic 310 may be programmed or structured to correct for this voltage drop. The voltage detection logic 310 compares the output voltage of the battery 214 to a voltage threshold value provided by the programmable low voltage threshold register 312 (e.g., using a comparator). The low voltage threshold register 312 may be set to any suitable value, and in at least some embodiments, this value is in the range of 2.0 Volts to 2.5 Volts, inclusive. If the voltage detection logic 310 determines that the output voltage of the battery 214 meets or drops below the voltage threshold value, the logic 310 generates a flag signal (e.g., a HIGH value on its output). This flag signal, which is otherwise LOW, is provided to the AND gate 316.

The output of the AND gate 316 is provided to the mode control logic 318. If the mode control logic 318 determines that the signal output by the AND gate 316 is HIGH, meaning that the outputs of both the logics 310, 314 are HIGH, then the mode control logic 318 switches the power mode of the fuel gauge 216 to a lower power mode than its present power mode. In at least some embodiments, the fuel gauge 216 is switched to the lowest power mode available for the fuel gauge 216. In preferred embodiments, the lower power mode is a standby mode (or "sleep" mode), although other lower power modes also may be used. For example, the fuel gauge 216 may switch from an active mode to an operation mode; or from an operation mode to a relaxed mode; or from a relaxed mode to a standby mode. Any and all such variations are encompassed within the scope of the disclosure.

To switch the fuel gauge 216 to a lower power mode, the mode control logic 318 may undertake any suitable action. For example and without limitation, the mode control logic 318 may disable the clock 320 used by the fuel gauge 216. It may also open the port 322 through which the fuel gauge 216 communicates with the ASIC 200. Other techniques for switching power modes are contemplated.

In at least some embodiments, the voltage detection logic 310 and the capacity detection logic 314 continue to monitor the battery voltage and the Coulomb counter output, respectively, after the fuel gauge 216 is switched to a lower power mode. If the voltage detection logic 310 determines that the voltage provided by the battery 214 is no longer at or below the voltage threshold value, or if the capacity detection logic 314 determines that the capacity of the battery 214 is no longer at or below the capacity threshold value, the output of the AND gate 316 becomes LOW, and the mode control logic 318 switches the fuel gauge power mode to a higher power mode.

Figure 4:
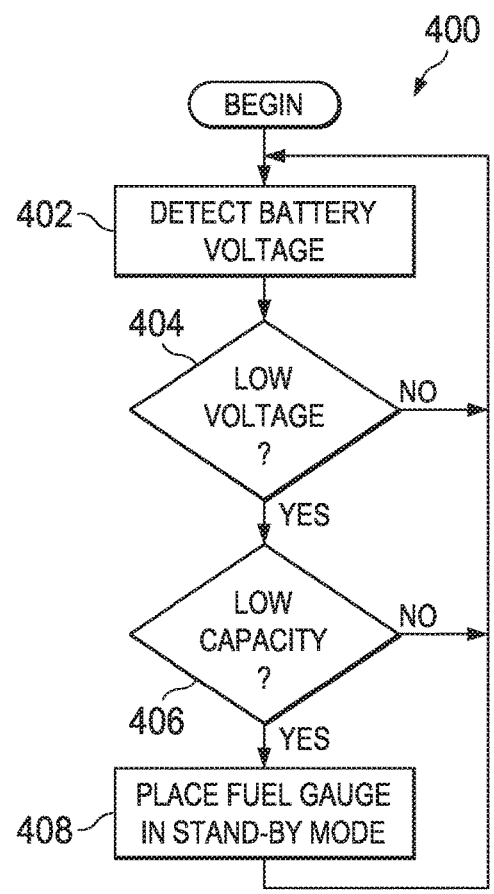
FIG. 4 is a flow diagram of a method usable to implement the techniques disclosed herein.

FIG. 4 is a flow diagram of a method 400 that implements the techniques disclosed herein. The method 400 begins by detecting the battery voltage (step 402), Next, the method 400 includes determining whether the battery voltage is at or below the programmed voltage threshold value (step 404). If not, control of the method returns to step 402. Otherwise, the method 400 includes determining whether the capacity of the battery is at or below the programmed capacity threshold value (step 406). If not, control of the method returns to step 402, Otherwise, the method 400 includes the fuel gauge autonomously switching itself into a lower power mode, such as a standby mode (step 408). The steps of the method 400 may be modified as desired, including by adding, deleting or rearranging steps.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

What is claimed is:

1. A system for an electronic device, comprising:
a battery to supply power to the electronic device; and
a fuel gauge coupled to the battery,
wherein the fuel gauge enters a standby mode upon determining:
that a voltage supplied by the battery is at or below a voltage threshold; and
that a capacity of the battery is at or below a capacity threshold,
wherein the voltage threshold is in the range of 2.0 Volts to 2.5 Volts, inclusive, and the capacity threshold is in the range of 0% to 5%, inclusive.

2. The system of claim 1, wherein the battery is a lithium-ion battery.

3. The system of claim 1, wherein the fuel gauge enters the standby mode if and only if the fuel gauge determines that the voltage supplied by the battery is at or below the voltage threshold and that concurrently the capacity of the battery is at or below the capacity threshold.

4. The system of claim 1, wherein the capacity of the battery is determined using a Coulomb counting technique.

5. The system of claim 1, wherein the standby mode is a lowest enabled power mode available on the fuel gauge.

6. The system of claim 1, wherein the fuel gauge enters the standby mode by disabling a port through which the fuel gauge communicates with another device.

7. The system of claim 1, wherein the fuel gauge enters the standby mode by stopping a clock associated with the fuel gauge.

8. The system of claim 1, wherein the voltage and capacity thresholds are programmable.

9. The system of claim 1, wherein the fuel gauge autonomously makes the determinations and autonomously enters the standby mode.

10. The system of claim 1, wherein the fuel gauge exits the standby mode upon detecting that the voltage has risen above the voltage threshold or that the capacity has risen above the capacity threshold.

11. The system of claim 1, wherein the fuel gauge enters the standby mode if the fuel gauge determines:
that the voltage supplied by the battery is at or below the voltage threshold; and
concurrently the capacity of the battery is at or below the capacity threshold.

12. The system of claim 1, wherein the fuel gauge is directly connected to the battery.

13. The system of claim 1, wherein the entire fuel gauge enters the standby mode upon determining:
that the voltage supplied by the battery is at or below the voltage threshold; and
that the capacity of the battery is at or below the capacity threshold.

14. An electronic device having a battery, comprising a fuel gauge monitoring power supplied by the battery, wherein the fuel gauge enters a standby power mode upon detecting that a voltage supplied by the battery is at or below a voltage threshold and that a capacity of the battery is at or below a capacity threshold, wherein the voltage threshold is in the range of 2.0 Volts to 2.5 Volts, inclusive, and the capacity threshold is in the range of 0% to 5%, inclusive.

15. The electronic device of claim 14, wherein the capacity threshold is between 0% and 1%, inclusive.

16. The electronic device of claim 14, the fuel gauge enters the standby power mode upon detecting that the voltage supplied by the battery is at or below the voltage threshold and concurrently that the capacity of the battery is at or below the capacity threshold.

17. The electronic device of claim 14, wherein the fuel gauge autonomously makes the detections and autonomously enters the standby mode.

18. A method for inhibiting the excessive discharge of a battery in an electronic device, comprising:
determining that a voltage supplied by the battery is at or below a voltage threshold and that a capacity of the battery is at or below a capacity threshold; and
causing a fuel gauge in the electronic device to enter a standby power mode based on the determination,
wherein the voltage threshold is in the range of 2.0 Volts to 2.5 Volts, inclusive, and the capacity threshold is in the range of 0% to 5%, inclusive.

19. The method of claim 18, wherein the capacity threshold is between 0% and 0.5%, inclusive.

20. The method of claim 18, wherein the standby power mode is the lowest enabled power mode available on the fuel gauge.

* * * * *